No. 689,788.  
J. F. BRYAN.  
SAW SWAGE.  
(Application filed Mar. 20, 1901.)  
Patented Dec. 24, 1901.
(No Model.)
Fig:2.
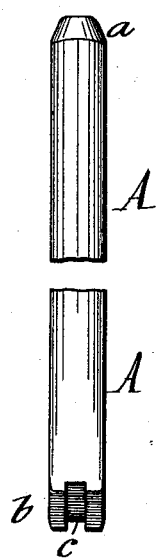
Fig:1.
Fig:3.
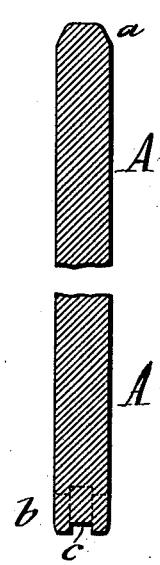
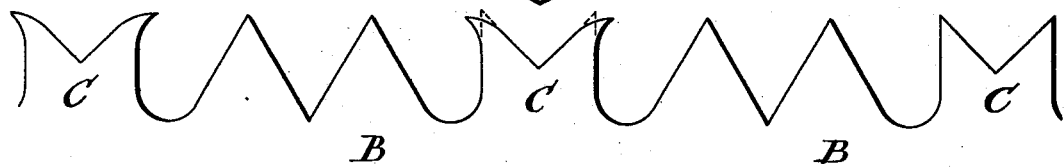
Fig:4.
WITNESSES:
Joseph H. Niles.
Harry S. Ford.
INVENTOR,
John F. Bryan,
BY
ATTORNEYS
THE NORRIS PETERS CO., PHOTO-LITHO., WASHINGTON, D. C.

UNITED STATES PATENT OFFICE.

JOHN F. BRYAN, OF SPRINGFIELD, OREGON.

SAW-SWAGE.

SPECIFICATION forming part of Letters Patent No. 689,788, dated December 24, 1901.

Application filed March 20, 1901. Serial No. 51,971. (No model.)

*To all whom it may concern:*

Be it known that I, JOHN F. BRYAN, a citizen of the United States, residing in Springfield, in the county of Lane and State of Oregon, have invented certain new and useful Improvements in Saw-Swages, of which the following is a specification.

This invention relates to an improved saw-swage for setting the V-shaped teeth of wood-saws after sharpening the same in a very convenient and effective manner; and the invention consists of a saw-swage which comprises a body or handle provided with an obtuse-angled lower end and a groove in said end, said groove extending longitudinally of the faces of said end and being open at its ends at the sides of the body.

In the accompanying drawings, Figure 1 is a side elevation of my improved saw-swage shown in position above a tooth. Fig. 2 is a side view at right angles to Fig. 1. Fig. 3 is a vertical longitudinal section the narrow way of the tool, and Fig. 4 is a bottom view.

Similar letters of reference indicate corresponding parts.

Referring to the drawings, A represents the handle of my improved tool for swaging the V-shaped teeth of wood-saws. The handle is preferably made of a solid piece of steel, which is provided with a blunt upper end $a$ for receiving the blows of a hammer or mallet and which is made at the lower end in the shape of an obtuse angle $b$ of greater angle than the V-shaped angle of the teeth of the wood-saw. The obtuse end of the saw-swage is provided with a central groove $c$, that is of slightly-greater width than the thickness of the blade B and teeth C of the saw, said groove extending longitudinally of the faces of said end and being open at its ends at the sides of the body.

When applying the saw-swage for use on the V-shaped saw-teeth of the saw, it is placed so that the groove $c$ receives the teeth, so as to bear on the edges of the same. A few blows are then struck on the head of the tool, which has the effect of turning the edges of the V-shaped teeth in outward direction, as shown in full lines in Fig. 1. In this manner the edges of the teeth are swaged ready for work. When the saw has been used for a time, the edges require reswaging, which is accomplished by the tool, which drives the edges again in outward direction. In this manner the V-shaped teeth of wood-saws can be readily reswaged by means of a very simple device, which can be furnished at comparatively small expense and which is always available for use.

Having thus described my invention, I claim as new and desire to secure by Letters Patent—

A saw-swage, consisting of a body or handle provided with an obtuse-angled lower end and a groove in said end, said groove extending longitudinally of the faces of said end and being open at its ends at the sides of the body, substantially as set forth.

In testimony that I claim the foregoing as my invention I have signed my name in presence of two subscribing witnesses.

JOHN F. BRYAN.

Witnesses:
 B. D. PAINE,
 G. A. SACHS.